(12) United States Patent
Gibson

(10) Patent No.: US 7,127,942 B2
(45) Date of Patent: Oct. 31, 2006

(54) WIND TUNNEL TESTING

(75) Inventor: Thomas M Gibson, Abergavenny (GB)

(73) Assignee: Airbus UK Limited, Bristol (GB)

( * ) Notice: Subject to any disclaimer, the term of this patent is extended or adjusted under 35 U.S.C. 154(b) by 121 days.

(21) Appl. No.: 10/362,733

(22) PCT Filed: Aug. 31, 2001

(86) PCT No.: PCT/GB01/03904

§ 371 (c)(1),
(2), (4) Date: Feb. 27, 2003

(87) PCT Pub. No.: WO02/21097

PCT Pub. Date: Mar. 14, 2002

(65) Prior Publication Data

US 2003/0177825 A1   Sep. 25, 2003

(30) Foreign Application Priority Data

Sep. 7, 2000   (GB) ................... 00219253

(51) Int. Cl.
*G01M 9/00*   (2006.01)
(52) U.S. Cl. ........................ 73/147
(58) Field of Classification Search ............. 73/170.01, 73/147
See application file for complete search history.

(56) References Cited

U.S. PATENT DOCUMENTS

| | | | | |
|---|---|---|---|---|
| 3,572,112 | A | * | 3/1971 | Igoe ............................ 73/147 |
| 3,587,306 | A | * | 6/1971 | Bryan .......................... 73/147 |
| 4,327,581 | A | * | 5/1982 | Jackson et al. ................ 73/147 |
| 4,372,158 | A | | 2/1983 | Doggett, Jr. et al. |
| 4,475,385 | A | * | 10/1984 | Farmer ........................ 73/147 |
| 4,809,553 | A | * | 3/1989 | Reed, III ..................... 73/583 |
| 4,862,739 | A | * | 9/1989 | Dobbs .......................... 73/147 |
| 4,926,684 | A | * | 5/1990 | Zilberman et al. ............ 73/147 |
| 5,644,075 | A | * | 7/1997 | Hefer ........................... 73/147 |
| 5,663,497 | A | * | 9/1997 | Mole ............................ 73/147 |
| 6,021,770 | A | * | 2/2000 | Sodaro ........................ 124/89 |
| 6,553,823 | B1 | * | 4/2003 | Omotani et al. .............. 73/147 |
| 6,796,171 | B1 | * | 9/2004 | Heisler et al. ................ 73/147 |

FOREIGN PATENT DOCUMENTS

| | | |
|---|---|---|
| GB | 1084260 | 9/1967 |
| GB | 1231662 | 5/1971 |

OTHER PUBLICATIONS

Sugiura Yasuo, Patent Abstracts of Japan, vol. 1996, No. 07, Jul. 1996 (JP08-075596).
A. Springer, "Evaluating Aerodynamic Characteristics of Wind-Tunnel Models Produced by Rapid Prototyping Methods" *Journal of Spacecraft and Rockets*, vol. 35, No. 6, Nov.-Dec. 1998, pp. 756-759.

* cited by examiner

*Primary Examiner*—Edward Lefkowitz
*Assistant Examiner*—Andre Allen
(74) *Attorney, Agent, or Firm*—Nixon & Vanderhye P.C.

(57) ABSTRACT

A wind tunnel model for wind tunnel testing having an additional mass mounted on the model via vibration absorbing material to dampen model vibration.

9 Claims, 3 Drawing Sheets

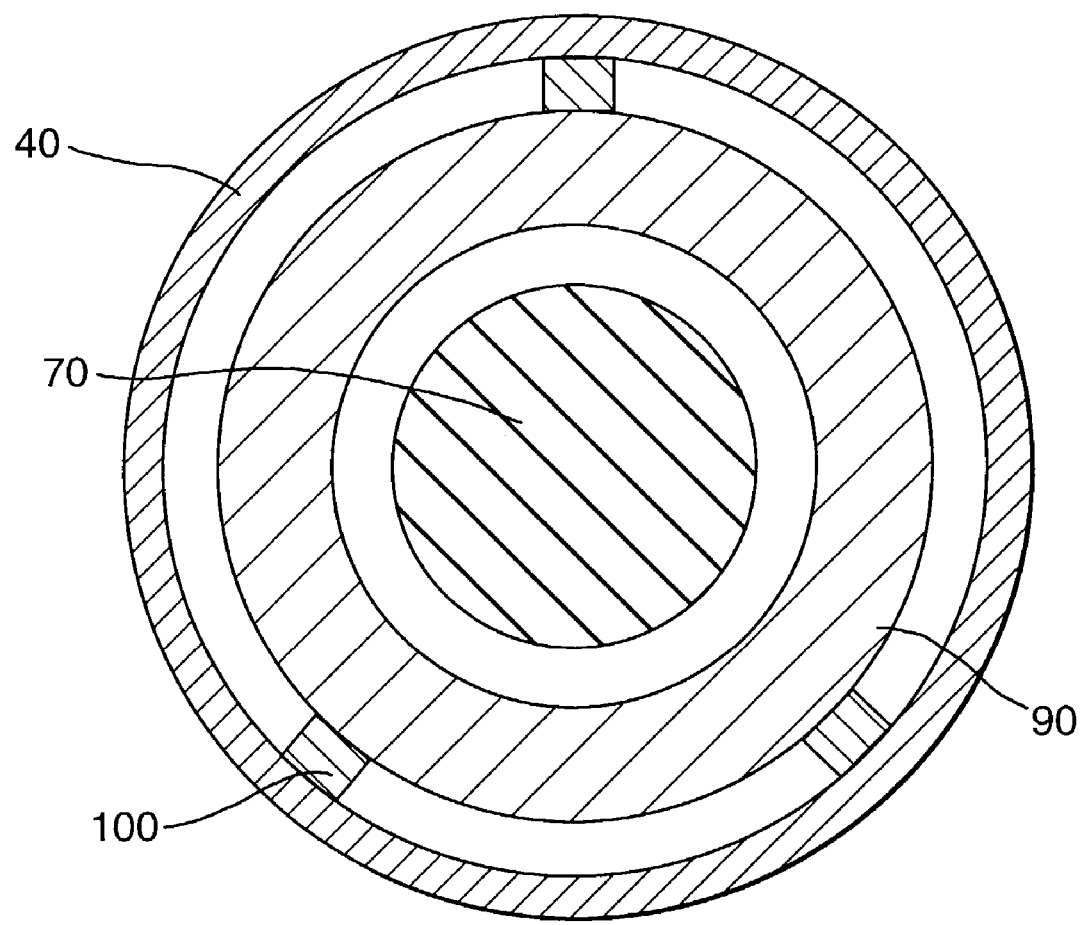

WIND TUNNEL TESTING

This application is the US national phase of international application PCT/GB01/03904, filed in English on 31 Aug. 2001, which designated the US. PCT/GB01/03904 claims priority to GB Application No. 0021925.3 filed 7 Sep. 2000. The entire contents of these applications are incorporated herein by reference.

The present invention relates to wind tunnel testing and is particularly concerned with wind tunnel testing model vibration.

Wind tunnel models for testing are manufactured to very high specification. The models can be assembled and dismantled with great accuracy and repeatability. High ambient pressure and very low temperatures within the tunnel can place extra demands on the models, both in terms of model strength and model shape. The resulting models tend to feature a minimal number of component parts, made of solid metal. This and the fact that the pieces have to be fitted together to tight tolerances results in a model which is very stiff, and therefore has little natural resistance to vibration should any of its natural frequencies be excited by flow turbulence and/or shock-wave oscillation.

When very high levels of model vibration occur the oscillatory component of the forces being measured can be so large that the desired mean value becomes worthless for many cases of interest. High vibration levels also often lead to tunnel emergency shut-downs in the middle of runs to avoid damage to the model and/or the tunnel. These vibration problems can lead to the scope of test programmes being cut back severely and good quality results being impossible to guarantee.

It is known to change the mass distribution of the model to attempt to change the resonant frequencies. In reality this requires mass to be added to the model since mass removal would be detrimental to the strength and the geometry of the model. Even if this is possible without affecting the geometry of the model, it is still a time consuming and expensive process to tune out the possibility of the model vibrating anywhere within the desired test envelope and may prove to be unsuccessful.

According to a first aspect of the present invention there is provided a wind tunnel model having an additional mass mounted on the model via vibration absorbing material.

The additional mass acts as a vibration damper. Mounting the additional mass on the vibration absorbing material allows the additional mass to move out of phase with any model vibrations, thereby interfering with any vibration build-up. The vibration absorbing material also dissipates energy.

It is preferred that the additional mass is mounted on vibration absorbing material designed to absorb model vibration to acceptable levels through a test envelope. This is achieved by selecting a material to act as the vibration absorbing material that has optimal vibration absorption properties for the vibration frequencies set up by the model in a particular test; (different types of vibration absorbing materials are better suited for damping different vibration frequencies), and optimising the volume distribution of the material around the additional mass. The material may be evenly distributed around the perimeter of the additional mass. It may also be positioned at the ends of the additional mass.

It has been found that small pads of the vibration absorbing material provide better vibration damping than shrouding the additional mass in a layer of the vibration absorbing material. This is due to the pads allowing the additional mass to move more freely than the layer of material and to thus set up a vibration further out of phase with the model. It has been found that placing the pads at the ends of the additional mass gives the additional mass good freedom of movement while maintaining a secure mounting with the model.

The pads may be made of a vibration absorbing material such as an elastomer, or a rubber or a foam rubber.

The additional mass may be hollow. For logistic reasons, it is preferred that the additional mass surrounds the wind tunnel sting. The outer profile of the additional mass may be similar in shape to the inner profile of a fuselage section of the model, to make best use of space available to house the additional mass.

According to a second aspect of the invention there is provided a method of wind tunnel testing including the steps of;

mounting an additional mass to a model via vibration absorbing material, and optimising the volume distribution and vibration absorption properties of the material to dampen model vibration to an acceptable level throughout the test envelope.

An embodiment of the present invention will now be described with reference to the accompanying drawings in which:

FIG. 3 shows a section along line III—III of FIG. 2 to an enlarged scale.

Figure 1:
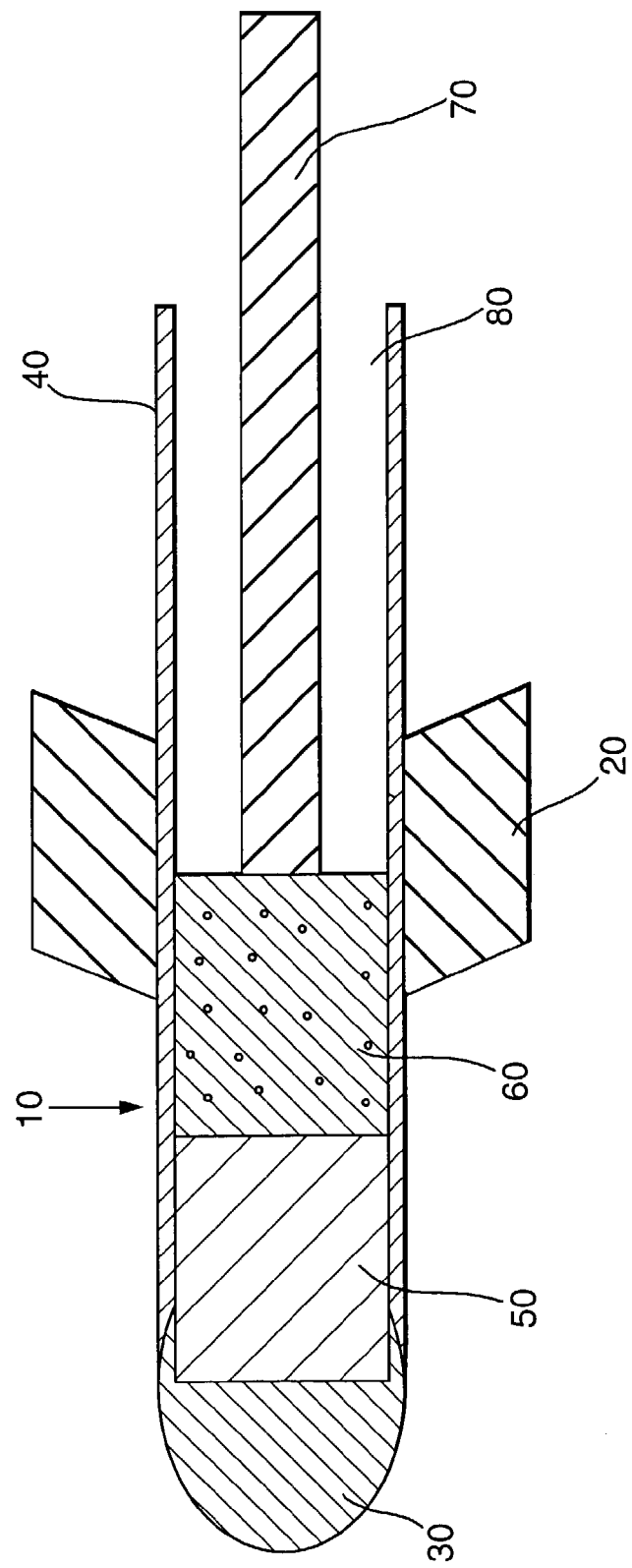
FIG. 1 shows a cross-sectional view of a wind tunnel test model according to the prior art.

Referring firstly to FIG. 1, there is shown a wind tunnel test model in standard configuration according to the prior art having a body 10 and wings 20. The body includes a nose section 30 and a fuselage section 40. Inside the fuselage section 40 there is instrumentation 50, the model balance 60, the wind tunnel sting 70 (by which the model is mounted on the wind tunnel), and a cavity 80 surrounding the wind tunnel sting.

Figure 2:
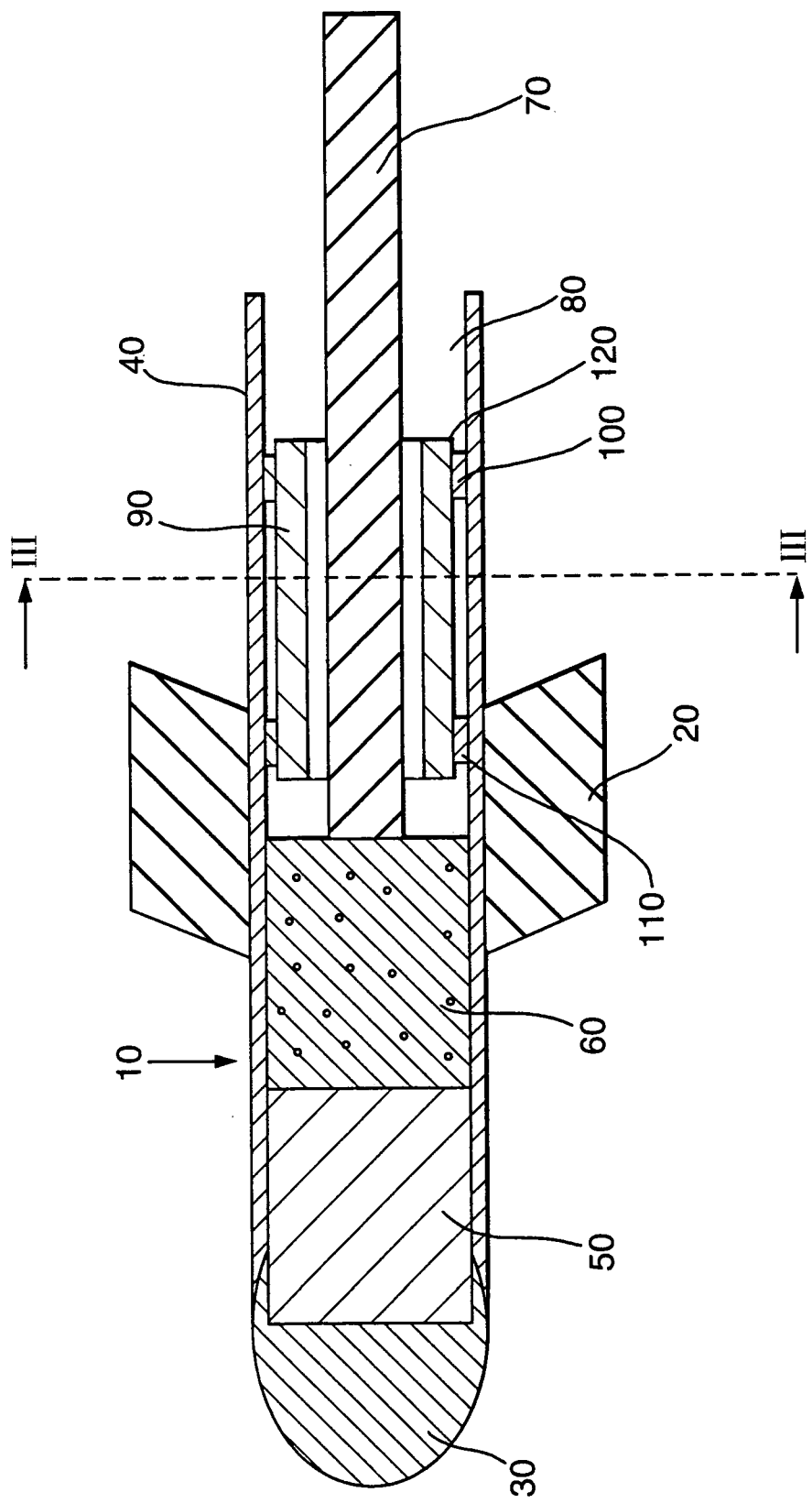
FIG. 2 shows a cross-sectional view of the model in FIG. 1, configured with an additional mass mounted on the model via pads of vibration absorbing material according to the present invention.

FIGS. 2 and 3 show a wind tunnel model as in FIG. 1 but additionally being configured with an additional mass 90 mounted on the model via pads of vibration absorbing material 100. The additional mass 90 is hollow and surrounds the wind tunnel sting 70. The additional mass 90 is not in contact with the wind tunnel sting 70 at any point. The additional mass 90 acts as a vibration damper. Mounting the additional mass 90 on pads of vibration absorbing material 100 at ends 110, 120 allows the additional mass to move out of phase with the model, thereby interfering with any vibration build-up. The pads 100 also dissipate energy.

The invention claimed is:

1. A wind tunnel model having an additional mass fixed to the model via vibration absorbing material, said material comprising a primary vibration absorber.

2. A model as claimed in claim 1 wherein the additional mass is fixed to the model via vibration absorbing material designed to dampen model vibration to an acceptable level throughout a test envelope by optimising the volume distribution of the material around the additional mass and the material's vibration absorption properties.

3. A model as claimed in claim 1 wherein the additional mass is fixed to the model inside of the model.

4. A model as claimed in claim 3 wherein the vibration absorbing material is evenly distributed around the perimeter of the additional mass.

5. A model as claimed in claim 2 wherein the additional mass is mounted on vibration absorbing material positioned at ends of the additional mass.

6. A model as claimed in claim 1 wherein the additional mass is hollow.

7. A model as claimed in claim 6 wherein the additional mass surrounds a sting for the wind tunnel model.

8. A model as claimed in claim 1 wherein an outer profile of the additional mass is similar in shape to an inner profile of a fuselage section of the model.

9. A method of wind tunnel testing including the steps of:

fixing an additional mass to a model via vibration absorbing material, and optimising the volume, distribution and vibration absorption properties of the material to dampen model vibration to an acceptable level throughout a test envelope.

* * * * *